(12) United States Patent
Lin

(10) Patent No.: US 7,478,217 B2
(45) Date of Patent: Jan. 13, 2009

(54) METHOD OF STORING BOTH LARGE AND SMALL FILES IN A DATA STORAGE DEVICE AND DATA STORAGE DEVICE THEREOF

(75) Inventor: Sung-Ching Lin, Taipei (TW)

(73) Assignee: MediaTek Inc., Science-Based Industrial Park, Hsin-Chu Hsien (TW)

( * ) Notice: Subject to any disclaimer, the term of this patent is extended or adjusted under 35 U.S.C. 154(b) by 356 days.

(21) Appl. No.: 11/278,966

(22) Filed: Apr. 7, 2006

(65) Prior Publication Data
US 2007/0239957 A1 Oct. 11, 2007

(51) Int. Cl.
*G06F 12/00* (2006.01)

(52) U.S. Cl. .................................. 711/170; 711/171

(58) Field of Classification Search ............ None
See application file for complete search history.

(56) References Cited

U.S. PATENT DOCUMENTS 6,745,311 B2 * 6/2004 Fabrizio et al. ............. 711/172

2005/0007838 A1 * 1/2005 Makela et al. ............... 365/199

* cited by examiner

*Primary Examiner*—Hyung S Sough
*Assistant Examiner*—Ngoc V Dinh
(74) *Attorney, Agent, or Firm*—Winston Hsu

(57) ABSTRACT

A method of storing files in a data storage device includes dividing a storage medium of the data storage device into identically sized storage units having a predetermined size, and indicating a status of each storage unit and relating chains of storage units storing a same file in a file allocation table on the storage medium; grouping the storage units into a plurality of groups having a predetermined number of adjacent storage units; assigning a file size classification when creating a file to be stored on the storage medium, the file size classification corresponding to an estimated amount of data in the file to be stored on the storage medium; and allocating at least one of the groups of adjacent storage units for storing the file if the file size classification is greater than a predetermined value.

20 Claims, 4 Drawing Sheets

METHOD OF STORING BOTH LARGE AND SMALL FILES IN A DATA STORAGE DEVICE AND DATA STORAGE DEVICE THEREOF

BACKGROUND

The invention relates to data storage devices, and more particularly, to a method and device for storing both large and small files in a data storage device.

One method of storage organization often utilized today involves listing partition information in a File Allocation Table (FAT). A partition is divided up into identically sized storage units. In some FAT systems these storage units are referred to as clusters, which are simply identically sized small blocks of contiguous space. Cluster sizes vary depending on the type of FAT file system being used and the size of the partition, typically cluster sizes lie somewhere between 2 KB and 32 KB. Each file may occupy one or more of these clusters depending on its size; thus, a file is represented by a chain of these clusters (referred to as a singly linked list). However these chains are not necessarily stored adjacently on the disk's surface but are often instead fragmented throughout the Data Region.

FIG. 1 shows a portion of a typical File Allocation Table (FAT) 100 according to the related art. The File Allocation Table (FAT) is a list of entries that map to each cluster on the partition. Each entry records one of five things:
- the address of the next cluster in a chain (shown as a numeric entry in FIG. 1)
- a special end of file (EOF) character that indicates the end of a chain (shown as the letter 'E' in FIG. 1)
- a special character to mark a bad cluster (not shown in FIG. 1)
- a special character to mark a reserved cluster (not shown in FIG. 1)
- a special character to note that that cluster is unused (shown as 'X' in FIG. 1)

Each version of the FAT file system uses a different size for FAT entries. The size is indicated by the name, for example the FAT16 file system uses 16 bits for each entry while the FAT32 file system uses 32 bits. This difference means that the File Allocation Table of a FAT32 system can map a greater number of clusters than FAT16, allowing for larger partition sizes with FAT32. This also allows for more efficient use of space than FAT16, because on the same hard drive a FAT32 table can address smaller cluster which means less wasted space.

In disc-type storage medium such as magnetic based hard disk drive systems and digital video/versatile disc based systems, two major factors impact file access performance: time to access metadata, and time to jump to successive storage units on the disc. Time to access metadata involves the time to process the FAT information to determine where on the disc the desired information is stored. For example, time to access metadata includes the time required to perform seek operations due to the FAT generally being located in an inner area of the disc/disk. When reading data of the file sequentially, this costs time to seek to inner areas of the disc/disk to read the metadata and determine a next storage unit in the chain, and then to seek back to the outer area of the disc/disk to continue reading data of the file. Mechanical operation is time-consuming. Time to jump to successive storage units includes the time required for the mechanical operations of the disc when performing other seek operations and disc rotation when moving from one storage unit to the next storage unit.

When deciding the size of each storage unit (i.e., cluster size), in order to reduce the time required by mechanically moving a pick up head across different areas of the disc, a larger storage unit size is desirable. In this way, more information of each file is read from adjacent data on the storage medium, and throughput is thereby increased. However, the result of a large storage unit size is that some smaller files may not fully fill a storage unit, or may leave a large portion of the last storage unit empty. Such a situation is commonly referred to as internal fragmentation and lowers the storage space efficiency of the storage medium. That is, internal fragmentation is simply wasted space within the storage system. A compromise must therefore be made between small storage size having efficient space utilization and large storage size having high speed data transfer throughput.

SUMMARY OF THE INVENTION

One objective of the claimed invention is therefore to provide a method and device for storing both small and large files in a data storage device, to thereby solve the above-mentioned problems and allow for both efficient space utilization and high speed data transfer.

According to an exemplary embodiment of the claimed invention, a method is disclosed of storing files in a data storage device, the method comprising dividing a storage medium of the data storage device into identically sized storage units having a predetermined size, and indicating a status of each storage unit and relating chains of storage units storing a same file in a file allocation table on the storage medium; grouping the storage units into a plurality of groups having a predetermined number of adjacent storage units; assigning a file size classification when creating a file to be stored on the storage medium, the file size classification corresponding to an estimated amount of data in the file to be stored on the storage medium; and allocating at least one of the groups of adjacent storage units for storing the file if the file size classification is greater than a predetermined value.

According to another exemplary embodiment of the claimed invention, a data storage device is disclosed comprising a storage medium divided into identically sized storage units having a predetermined size; a file allocation table on the storage medium for indicating a status of each storage unit and relating chains of storage units storing a same file; and a central processing unit for grouping the storage units into a plurality of groups having a predetermined number of adjacent storage units; assigning a file size classification when creating a file to be stored on the storage medium, the file size classification corresponding to an estimated amount of data in the file to be stored on the storage medium; and allocating at least one of the groups of adjacent storage units for storing the file if the file size classification is greater than a predetermined value.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
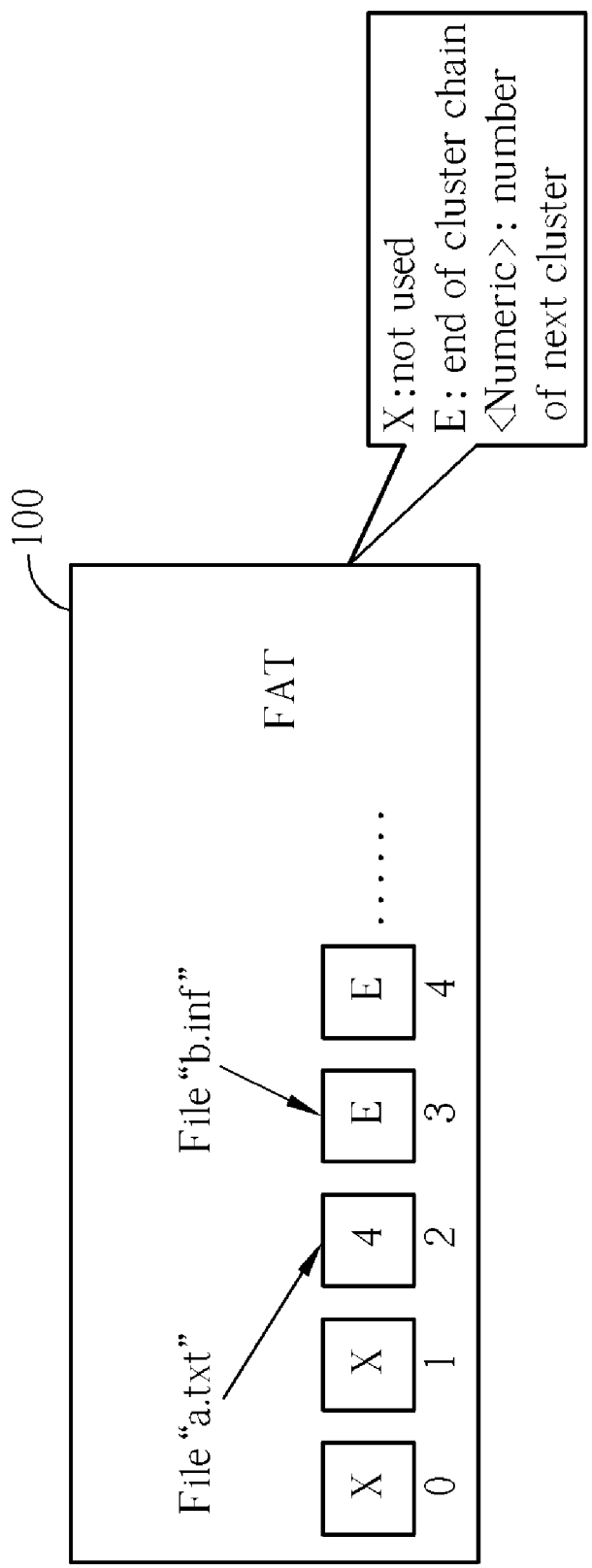
FIG. 1 shows a portion of a typical File Allocation Table (FAT) according to the related art.
Figure 2:
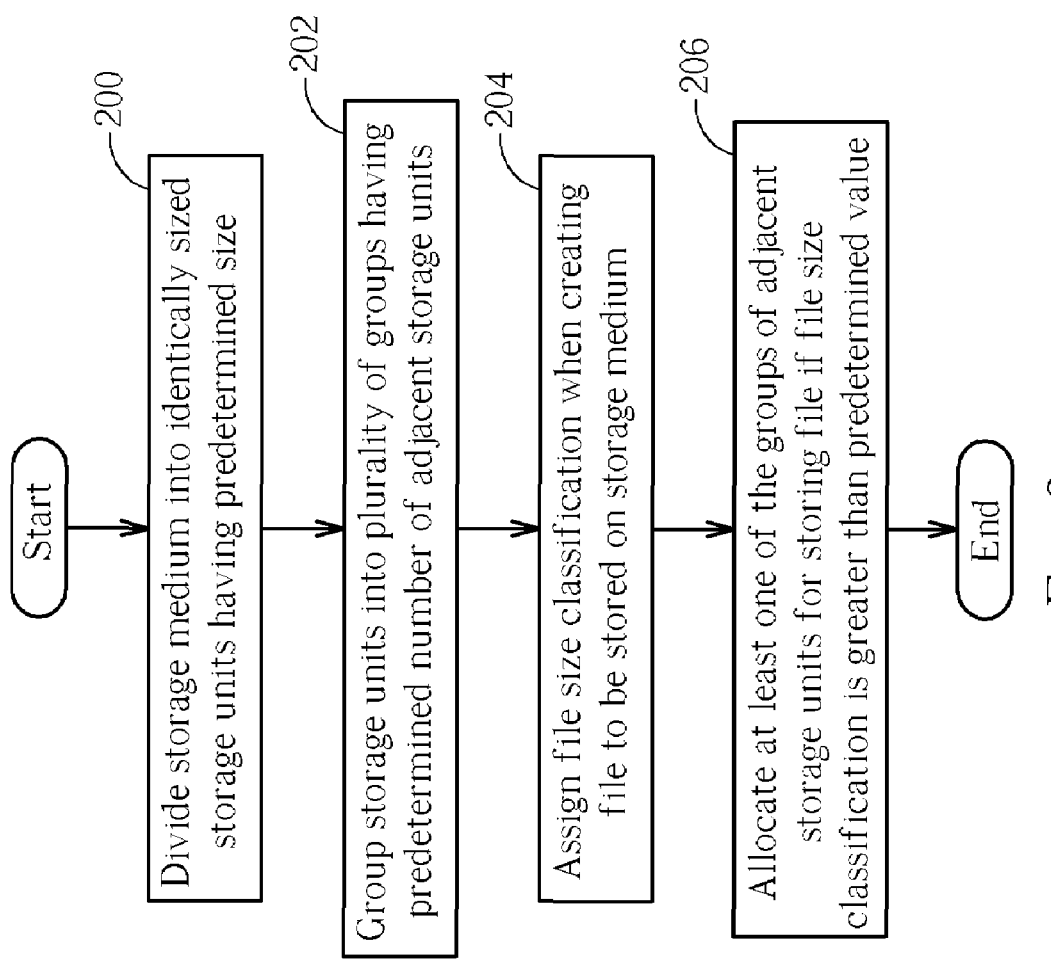
FIG. 2 shows a flowchart describing a method of storing files in a data storage device according to a first exemplary embodiment.

FIG. 2 shows a flowchart describing a method of storing files in a data storage device according to a first exemplary embodiment. Provided that substantially the same result is achieved, the steps of the flowchart shown in FIG. 2 need not be in the exact order shown and need not be contiguous, that is, other steps can be intermediate. In this embodiment, storing files in a data storage device includes the following steps:

Step 200: Divide a storage medium of the data storage device into identically sized storage units having a predetermined size, and indicating a status of each storage unit and relating chains of storage units storing a same file in a file allocation table on the storage medium. For example, step 200 could be implemented by the same file allocation table technology of the related art shown in FIG. 1.

Step 202: Group the storage units into a plurality of groups having a predetermined number of adjacent storage units. As shown in FIG. 2, the storage units of this exemplary embodiment have been grouped into groups of four. It should also be noted that a grouping size of four is simply shown for exemplary purposes. In a real implementation, the grouping number would typically be larger, however, any group size could be utilized.

Step 203: Assign a file size classification when creating a file to be stored on the storage medium. The file size classification corresponds to an estimated amount of data that will be stored in the file on the storage medium. For example, in this embodiment, files are classified into large files being greater that a predetermined file size, and small files being smaller than the predetermined file size.

Step 204: Allocate at least one of the groups of adjacent storage units for storing the file if the file size classification is greater than a predetermined value. In other words, large files are stored utilizing a group of adjacent storage units, and in a preferred embodiment, utilizing groups of adjacent storage units when the file size is sufficiently large to require more than one group.

Figure 3:
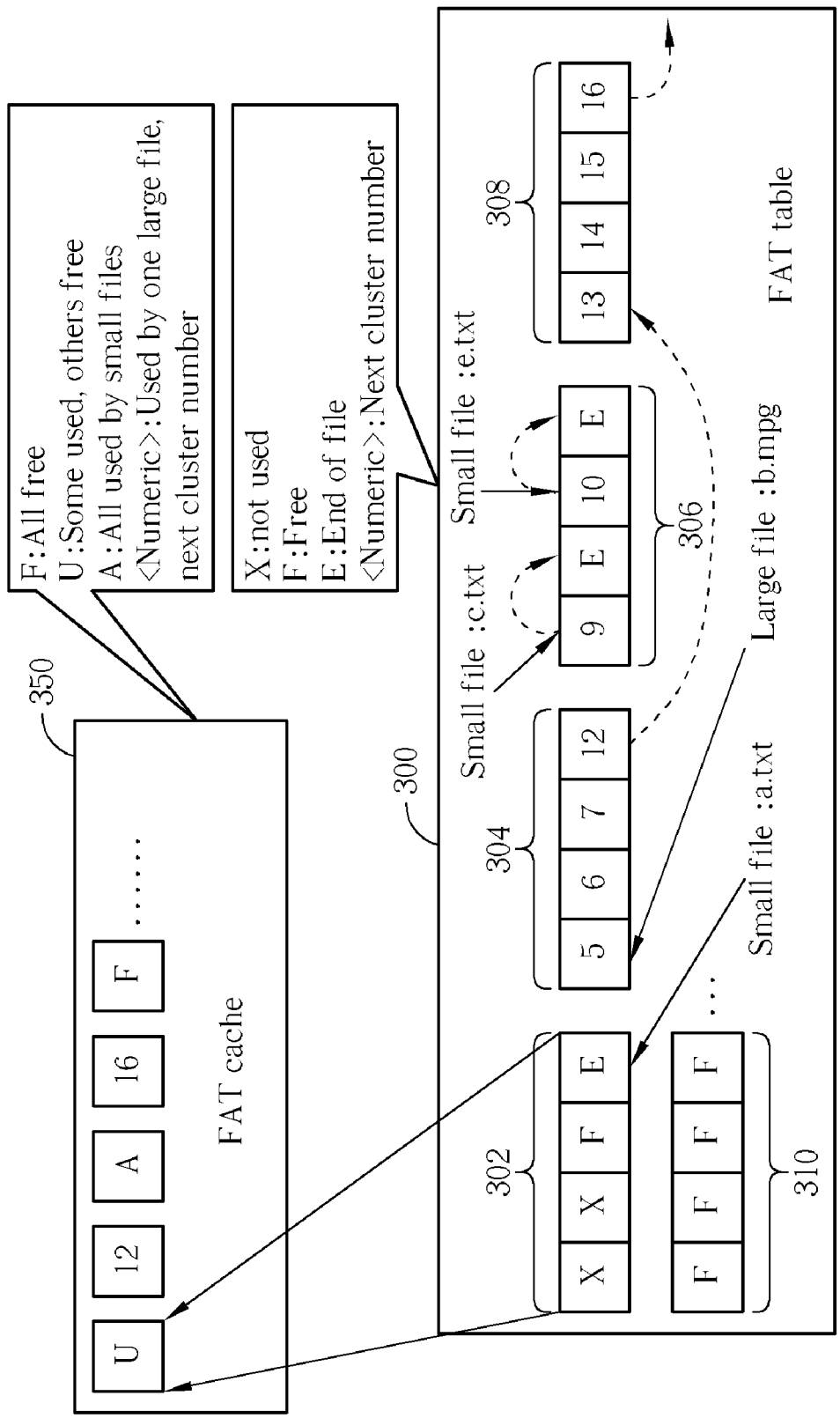
FIG. 3 shows a file allocation table (FAT table) and a file allocation table cache (FAT cache) according to an exemplary embodiment.

FIG. 3 shows a file allocation table (FAT table) 300 and a file allocation table cache (FAT cache) 350 according to an exemplary embodiment. Each of the storage units of the FAT table 300 corresponds to a cluster in a FAT-16 or FAT-32 based storage system or another FAT compatible system. The purpose of the FAT cache 350 is to further reduce the time to access metadata of the FAT table 300. As such, the operation of the FAT cache 350 is described later on this description.

Concerning the FAT table 300, it is pointed out that the storage units (i.e., clusters) of the FAT table 300 are grouped into groups 302, 304, 306, 308, 310 of adjacent storage units. For example, each group 302, 304, 306, 308, 310 is shown having four adjacent storage units; however, as previously mentioned, other group sizes could also be utilized.

The overall principle of this embodiment is that large files are firstly considered to store on the storage medium using free groups of adjacent storage units. In this way, the data transfer throughput of large files will be optimized. This is important for large files since large files obviously have a large amount of data that must be transferred. This is shown in FIG. 3 when looking at large file 'b.mpg' being stored in group 304 and group 308. When accessing (either reading or writing) the 'b.mpg', a pickup head of the storage device only needs to seek once to the position corresponding to storage unit 4 at the beginning of group 304. The next three adjacent storage blocks 5, 6, and 7 are then accessed. Because these four storage blocks 4, 5, 6, 7 are all adjacent, no extra seeking operation is required when jumping from one to the other. The mechanical operation of the storage device is therefore simply to seek to the position corresponding to storage block number 4 and then continuously read to the position corresponding to storage block number 7. As shown in the FAT table 300, the next storage block after storage block number 7 is indicated as storage block number 12. A seek operation is then performed to storage block number 12, which is the first block of group 308 and is also adjacent to three other storage blocks containing data of the 'b.mpg' file. When storing new data into a large file, the storage system will allocate a group of adjacent storage units being all free. For example, group 310 could be utilized to storage data of a file being classified as a large file.

Small files being less than the predetermined file size are stored utilizing single storage units (or linked lists of single storage units) similar to the related art. In this way, the internal fragmentation of the storage medium is reduced for small files, while the data transfer throughput is increased for large files.

Besides the grouping of the FAT table 300 into the above mentioned groups 302, 304, 306, 308, 310, the actual organization and structure of the FAT table 300 is the same as that of the related art. In this way, storage media written to by this embodiment are completely compatible with storage media written to by storage devices of the related art.

As previously mentioned, in order to reduce the time to access metadata of the FAT table 300, a status of each of the groups of adjacent storage units 302, 304, 306, 308, 310 is stored in a file allocation cache (FAT cache) 350 in another embodiment. The FAT cache 350 contains a status for each group of the FAT table 300, the possible status values being one of the following values:

'F': indicates all adjacent storage units of a particular group are free.

'U': indicates some of the adjacent storage units of the particular group are utilized and some are free.

'A': indicates all of the adjacent storage units of the particular group are utilized by files having a file size classification being less than the predetermined value.

'<Numeric>': indicates that all of the adjacent storage units of the particular group are utilized by a single file having a file size classification being greater than the predetermined value and a pointer to a next group of adjacent storage units storing data from the file having the file size classification being greater than the predetermined value.

In order to speed up accessing the metadata of the FAT table 300, the FAT cache 350 is stored in a dynamic random access memory DRAM and all file storage, allocation, and accessing operations of the storage medium are first performed utilizing the FAT cache 350. For example, when storing a large file, only groups having a status of 'F' (meaning all storage units of this group are free) are allocated and utilized to store the large file. Likewise, when reading a large file, the statuses in the FAT cache give the first storage unit number of the next group of adjacent storage units storing data of the large file. When storing a small file, only groups having a status of 'F' or 'U' (meaning there is at least one storage unit still available) are utilized to store the small file. For example, in one embodiment, when the file system is created, all groups have a status of 'F', and when allocating a storage unit for a small file, groups having a status of 'U' are first utilized. If not found, a group with a status of 'F' is utilized instead. When a group of storage units becomes totally filled with small files, the status of 'A' is utilized to prevent wasted time inspecting that group when storing additional small files.

In fact, for large files, it may not be necessary to access the FAT table on the storage medium at all during normal operations. Instead, the FAT table can simply be synchronized with the FAT cache at system shutdown. This is possible because the FAT cache will already indicate the next storage unit for each large file and the entire current group of adjacent storage units will be utilized by the large file so the system can fill in all the linked list details between individual storage units for the large files in the FAT table during system shutdown.

Figure 4:
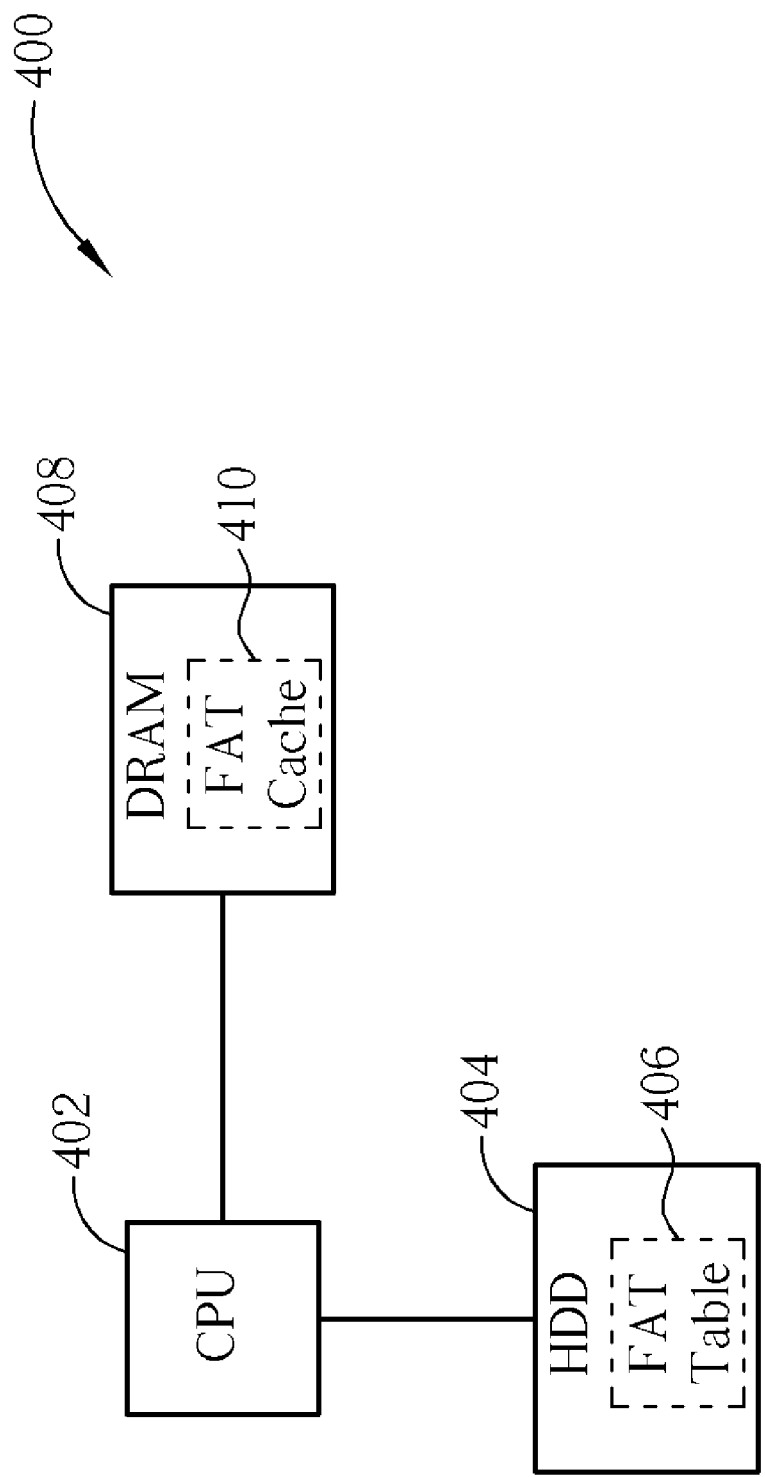
FIG. 4 shows a data storage device according to an exemplary embodiment.

FIG. 4 shows a data storage device 400 according to an exemplary embodiment. As shown in FIG. 4, the data storage device 400 of this embodiment includes a central processing unit CPU 402, a disc based storage medium such as a hard disk drive (HDD) 404, and a dynamic random access memory (DRAM) 408. The hard disk drive 404 further includes a file allocation table (FAT table) 406, and the DRAM 408 further includes the file allocation table cache (FAT cache) 410.

The storage medium 404 is divided into identically sized storage units (i.e., clusters) having a predetermined size. The FAT table 406 on the storage medium 408 is for indicating a status of each storage unit and relating chains of storage units storing a same file. The CPU 402 groups the storage units into a plurality of groups having a predetermined number of adjacent storage units. Additionally, the CPU 402 assigns a file size classification when creating a file to be stored on the storage medium, the file size classification corresponding to an amount of data in the file to be stored on the storage medium; and allocates at least one of the groups of adjacent storage units for storing the file if the file size classification is greater than a predetermined value. If the file size classification is less than the predetermined value, the CPU 402 simply allocates at least one unused storage unit for storing the file.

The present invention provides a method of storing files in a data storage device, the method including dividing a storage medium of the data storage device into identically sized storage units having a predetermined size, and indicating a status of each storage unit and relating chains of storage units storing a same file in a file allocation table on the storage medium; grouping the storage units into a plurality of groups having a predetermined number of adjacent storage units; assigning a file size classification when creating a file to be stored on the storage medium, the file size classification corresponding to an amount of data in the file to be stored on the storage medium; and allocating at least one of the groups of adjacent storage units for storing the file if the file size classification is greater than a predetermined value.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of storing files in a data storage device, the method comprising:
    dividing a storage medium of the data storage device into identically sized storage units having a predetermined size, and indicating a status of each storage unit and relating chains of storage units storing a same file in a file allocation table on the storage medium;
    grouping the storage units into a plurality of groups having a predetermined number of adjacent storage units;
    assigning a file size classification when creating a file to be stored on the storage medium, the file size classification corresponding to an estimated amount of data in the file to be stored on the storage medium; and
    allocating at least one of the groups of adjacent storage units for storing the file if the file size classification is greater than a predetermined value.

2. The method of claim 1, further comprising allocating a plurality of unused groups of adjacent storage units for storing the file if the file size classification is greater than a predetermined value and the file is larger than the storage capacity of a single group of adjacent storage units.

3. The method of claim 1, further comprising allocating at least one unused storage unit for storing the file if the file size classification is less than the predetermined value.

4. The method of claim 3, further comprising allocating a plurality of unused storage units for storing the file if the file size classification is less than the predetermined value and the file is larger than the storage capacity of a single storage unit.

5. The method of claim 1, further comprising storing a status of each of the groups of adjacent storage units in a file allocation cache.

6. The method of claim 5, wherein possible status values of each of the groups of adjacent storage units comprise a first status indicating all adjacent storage units of a particular group are free, a second status indicating some of the adjacent storage units of the particular group are utilized and some are free; a third status indicating all of the adjacent storage units of the particular group are utilized by files having a file size classification being less than the predetermined value; and a fourth status indicating that all of the adjacent storage units of the particular group are utilized by a single file having a file size classification being greater than the predetermined value and a pointer to a next group of adjacent storage units storing data from the file having the file size classification being greater than the predetermined value.

7. The method of claim 5, further comprising providing a dynamic random access memory for storing the file allocation cache.

8. The method of claim 5, further comprising referencing the file allocation cache when accessing files on the storage medium.

9. The method of claim 5, further comprising synchronizing the file allocation table with the file allocation cache at shutdown.

10. The method of claim 1, wherein each of the storage units corresponds to a cluster in a FAT-16 or FAT-32 based storage system.

11. A data storage device comprising:
    a storage medium divided into identically sized storage units having a predetermined size;
    a file allocation table on the storage medium is configured to indicate a status of each storage unit and relating chains of storage units storing a same file; and
    a central processing unit is configured: to group the storage units into a plurality of groups having a predetermined number of adjacent storage units; to assign a file size classification when creating a file to be stored on the storage medium, the file size classification corresponding to an estimated amount of data in the file to be stored on the storage medium; and to allocate at least one of the groups of adjacent storage units for storing the file if the file size classification is greater than a predetermined value.

12. The data storage device of claim 11, wherein the central processing unit is further for allocating a plurality of unused groups of adjacent storage units for storing the file if the file size classification is greater than a predetermined value and the file is larger than the storage capacity of a single group of adjacent storage units.

13. The data storage device of claim 11, wherein the central processing unit is further for allocating at least one unused storage unit for storing the file if the file size classification is less than the predetermined value.

14. The data storage device of claim 13, wherein the central processing unit is further for allocating a plurality of unused storage units for storing the file if the file size classification is less than the predetermined value and the file is larger than the storage capacity of a single storage unit.

15. The data storage device of claim 11, further comprising a file allocation cache for storing a status of each of the groups of adjacent storage units.

16. The data storage device of claim 15, wherein possible status values of each of the groups of adjacent storage units comprise a first status indicating all adjacent storage units of a particular group are free, a second status indicating some of the adjacent storage units of the particular group are utilized and some are free; a third status indicating all of the adjacent storage units of the particular group are utilized by files having a file size classification being less than the predetermined value; and a fourth status indicating that all of the adjacent storage units of the particular group are utilized by a single file having a file size classification being greater than the predetermined value and a pointer to a next group of adjacent storage units storing data from the file having the file size classification being greater than the predetermined value.

17. The data storage device of claim 15, further comprising a dynamic random access memory for storing the file allocation cache.

18. The data storage device of claim 15, wherein the central processing unit is further for referencing the file allocation cache when accessing files on the storage medium.

19. The data storage device of claim 15, wherein the central processing unit is further for synchronizing the file allocation table with the file allocation cache at shutdown.

20. The data storage device of claim 11, wherein each of the storage units corresponds to a cluster in a FAT-16 or FAT-32 based storage system.

* * * * *